Figure 1:
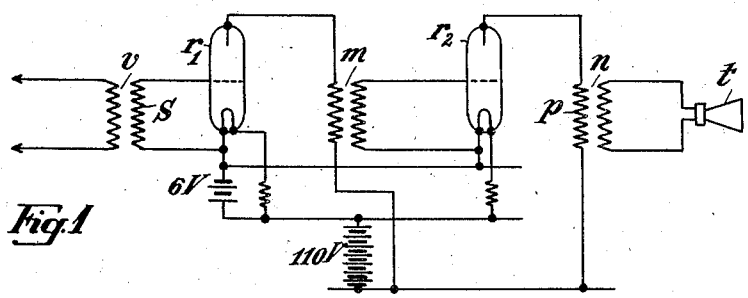

May 12, 1925.

B. G. POHLMANN

PROTECTIVE CONNECTION FOR AMPLIFIER SYSTEMS

Filed Oct. 26, 1920    2 Sheets-Sheet 1

Bruno Gerhard Pohlmann, Inventor

By Knight
Attorneys

May 12, 1925.

B. G. POHLMANN 1,537,877

PROTECTIVE CONNECTION FOR AMPLIFIER SYSTEMS

Filed Oct. 26, 1920   2 Sheets-Sheet 2

Patented May 12, 1925.

1,537,877

UNITED STATES PATENT OFFICE.

BRUNO GERHARD POHLMANN, OF SIEMENSSTADT, NEAR BERLIN, GERMANY, ASSIGNOR TO SIEMENS & HALSKE, AKTIENGESELLSCHAFT, OF SIEMENSSTADT, NEAR BERLIN, GERMANY, A GERMAN CORPORATION.

PROTECTIVE CONNECTION FOR AMPLIFIER SYSTEMS.

Application filed October 26, 1920. Serial No. 419,781.

(GRANTED UNDER THE PROVISIONS OF THE ACT OF MARCH 3, 1921, 41 STAT. L., 1313.)

*To all whom it may concern:*

Be it known that I, BRUNO GERHARD POHLMANN, a citizen of the German Empire, residing at Siemensstadt, near Berlin, Germany, have invented certain new and useful Improvements in Protective Connections for Amplifier Systems (for which I have filed applications in Germany, July 7, 1916, Patent No. 300,143; Oct. 24, 1916, Patent No. 300,621; Oct. 25, 1916, Patent No. 304,307; March 3, 1919, Patent No. 350,581; Hungary May 23, 1917, Oct. 6, 1917, Oct. 18, 1917; Austria June 23, 1917, Oct. 13, 1917; Sweden Dec. 23, 1919; Norway Dec. 24, 1919; Denmark April 24, 1920; Switzerland May 18, 1920; France June 18, 1920; Belgium June 21, 1920; Holland June 3, 1920; Italy June 12, 1920; England July 2, 1920; Austria October 2, 1917; Japan July 3, 1920, Czechoslovakia, June 23, 1920), of which the following is a specification.

My invention relates to a system of connection for one or more amplifying tubes connected in series. Connections of the kind specified, especially in cases where the degree of amplification is high there is liable to arise a self-excitation of the connection which will become evident by distortions of the spoken communications transmitted across the line or else by a roaring of the system. It is obvious that disturbances of this nature are apt to render the use of such amplifiers impracticable. This self-excitation is caused by the amplified alternating currents returning in some manner to the receiving end of one or several amplifiers, so that consequently a portion of the amplified current will be re-amplified.

Disturbances of this character, caused by such feed-back phenomena have hitherto principally been attributed to the fact that the individual coupling elements, connecting the amplifiers of the system are mutually influenced by electro-magnetic stray fluxes. To avoid these disturbances it has therefore been already proposed to enclose these coupling elements or translators in metal casings, more particularly in iron casings, and by such means to prevent such electromagnetic coupling. Practical experience, however, has shown that these means are in themselves insufficient to remove these disturbances in all cases.

My invention is based on the discovery that outside of the electromagnetic influence, there are also other causes which enter into play and give rise to the aforesaid disturbances. Thus it has been found that the capacity of the ends of the windings of the individual interconnecting translators relative to their surroundings (earth) contributes no less to the disturbances than the aforementioned incidental inductive recoupling or feed-back phenomenon. And in like manner the reciprocal electrostatic action prevailing between certain other parts of an amplifier system may also be the cause of such self excitation. And in addition it has been discovered that in the case of amplifying systems, in so-called cascade arrangements, where only a single anode battery is employed for the anode circuits of the individual amplifier tubes, one cause of the self-excitation may reside in the fact that the current returning from the amplifier to the battery gives rise to the production of currents in the receiving circuit of the amplifier immediately preceding, because the amplified current, in proportion to its intensity and the internal resistance maintained by the battery at its poles, produces a potential difference. According to this invention, the return coupling disturbances produced by these causes are prevented and avoided by suitable means of connection which either entirely remove the cause of said disturbances or else eliminate their effect.

Generally considered, amplifier tubes possess a very high internal resistance. For this reason the translators, serving to transmit the incoming current to the amplifiers and which also transfer the amplified currents further, must have a very high ratio of transmission and therefore a very large number of turns. Consequently, there prevail very high alternating current voltages at the ends of the translator windings as also at the amplifiers. Since, moreover, the translator winding possesses very considerable impedance values, the capacities prevailing at its ends constitute relatively to the earth a comparatively close coupling between the individual translators, which again may easily be the cause of re-coupling disturbances, since in cases where the degree of amplification is very high, even a loose coupling will cause currents of considerable intensity to be transmitted from the transmitting end to the receiving end of the amplifier system.

In accordance with the present invention, the disturbances, due to the causes stated hereinbefore, are removed by grounding, preferably across capacities, all the translator windings, except the connections of the receiving and transmitting ends—and even not excepting those, should it be more expedient—for the purpose of either rendering the earth capacity couplings between the windings of the individual translators harmless, or else avoiding such couplings altogether.

Various embodiments of the subject matter of my invention are shown by way of example in the accompanying drawing, in which—

Figures 2, 3:
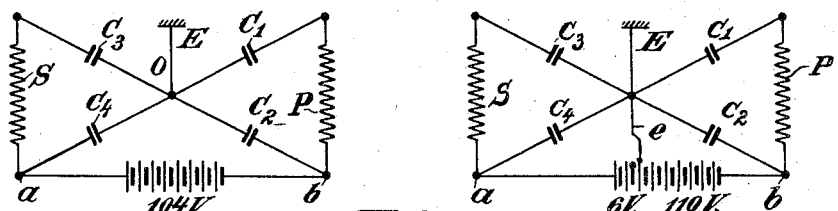
Figure 4:
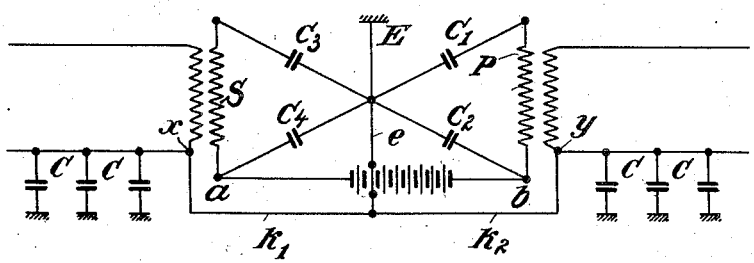
Figure 5:
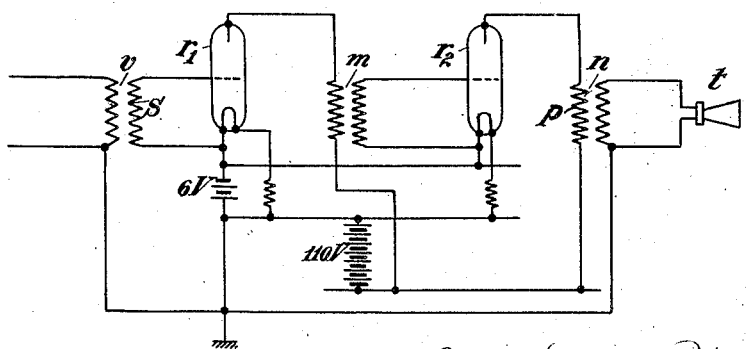
Figure 6:
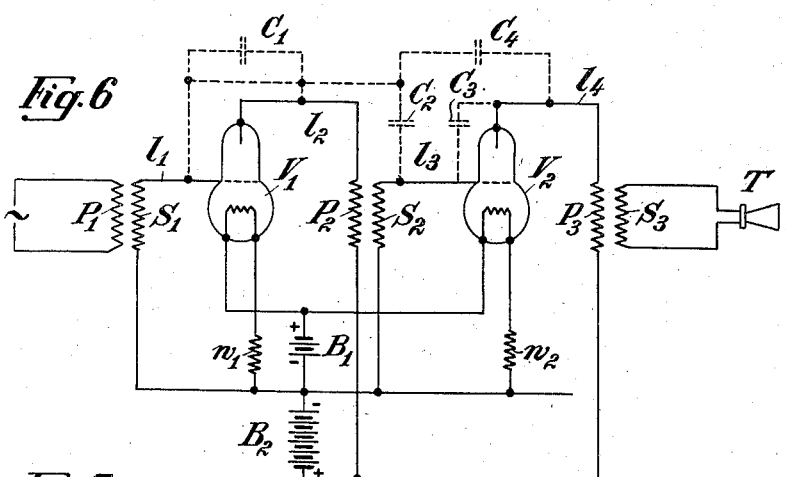
Figure 7:
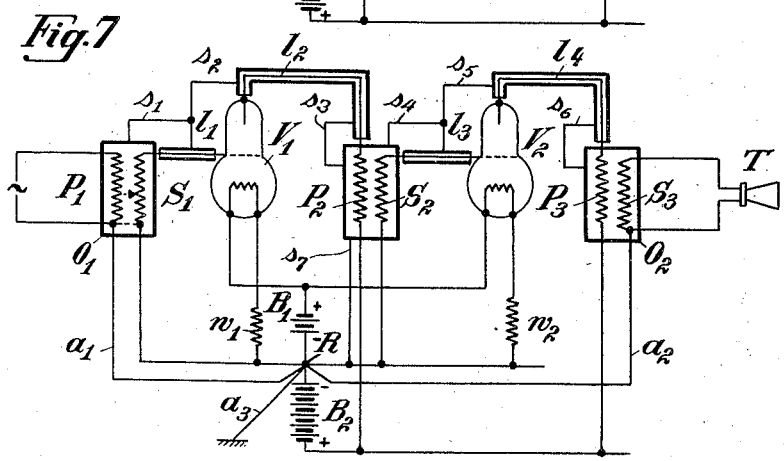

Fig. 1 is a diagram of a system of connection for two amplifier tubes,

Fig. 2 is a diagram showing the action of the last translator of the system on the first translator thereof, with certain parts shown in Fig. 1 omitted, Fig. 3 is a similar diagram showing an improved system of connection in accordance with this invention, Fig. 4 is a diagram showing a form of connection for the windings of the receiving and transmitting sides, Fig. 5 shows a diagrammatic view of a protective connection, Figs. 6 and 7 show a sound amplifying arrangement in accordance with this invention comprising two cathode ray tubes in cascade connection.

In the form of connection shown in Fig. 1 two cathode tubes $r^1$, $r^2$ connected in series act as the amplifying devices. The incoming current passes across a pre-translator $v$ into the first tube $r^1$, the amplified current of which is transmitted across an additional centrally disposed translator $m$ to the receiving side of the second tube $r^2$. A sub-translator $n$ finally serves to connect the transmitter side of the second tube with the point of indication, say, a telephone $t$. A 6-volt battery supplies the current for the filaments of the cathode tubes, while a 110-volt battery supplies the anode current for the transmitter sides of both amplifier tubes.

In a connection of the aforesaid kind, roaring will be most apt to arise the moment the outer translators $v$ and $n$ happen to be intercoupled, due to the general arrangement of the system. On duly considering the action of the primary coil P of the last translator $n$ on the secondary winding S of the pre-translator $v$ there results the simplified diagram shown in Fig. 2, in which only those elements of the system of connections disclosed in Fig. 1 have been included which have any bearing on the present discussion.

The ends of the primary coil P of the sub-translator $n$ possess a partial capacity $C^1$, $C^2$ relatively to the earth, while the ends of the secondary winding S of the pre-translator $v$ possess the partial capacities $C^3$, $C^4$. The points $a$ and $b$ of the windings S and P are connected by the battery as if by a short circuit, owing to the slight resistance prevailing. Assuming the earth to possess the potential O, and the ends of the winding P the potentials $V^1$ and $V^2$, then there will also prevail at the point $a$ the potential $V^1$. The possibility is thus given of a current corresponding to the difference of potential $V^1$—O, flowing across the winding S across $C^3$ to the earth E. Hence, a portion of the amplified alternating current which is to be transmitted to the telephone $t$ will return to the receiving side of the first tube, causing a renewed amplification thereof and therewith the resulting roaring of the connection.

This drawback is obviated in accordance with this invention by individual points of the system, from which already amplified currents might be liable to return to the receiving side of the tubes, being connected, preferably by means of capacities, in such manner that the potential appertaining to these points will either be entirely or approximately reduced to O.

Fig. 3 shows a modification in which the object specified is realized by the batteries being connected at their negative pole by aid of a main $e$ to the earth. By these means the difference of potential between the point $a$ of coil S and the earth, and in fact the alternating current potential $V^1$, is reduced to zero.

The foregoing considerations will apply to all such sets of windings which, as the one described, are connected by the battery or directly unilaterally. In this way all the windings are connected with each other, with the sole exception of those to which the receiving and transmitting sides are connected. Under certain conditions it may be necessary, however, to also render the coupling of these windings innocuous. This object may be attained by these windings being unilaterally connected to the rest of the windings by means of the connection $k^1$, $k^2$ shown in Fig. 4, i. e. always one terminal $x$ or $y$, respectively, of the secondary winding of the translator is applied to the negative pole of their respective battery. Purely theoretically the same result would be obtained if point $a$ were directly connected to $x$ and $b$ to $y$. From a practical viewpoint this would, however, involve the disadvantage that owing to the negative pole of the batteries being grounded (say, for example, by means of the connection $e$) the receiving end would carry a 110-volt continuous current voltage relatively to the earth.

Very frequently, particularly when the degree of amplification is not too high, the connections $k^1$, $k^2$, shown in Fig. 4 will prove sufficient toward removing the disturbance, without requiring any grounding for the following reasons: As will be seen in Fig. 2, a large proportion of the amplified current flowing from $b$ to $a$ does not traverse the winding S and the capacity $C^3$, but traverses directly the capacity $C^4$. Now while the earth connection of the battery disclosed in Fig. 3 represents a simple short circuit of the path of the current across S—$C^3$, the disturbance may under certain conditions be already removed by considerably increasing the capacity $C^4$. Such a form of connection is shown diagrammatically in Fig. 4. In this form of connection there are connected additional big capacities in parallel to the capacities $C^2$ and $C^4$. To supply these additional capacities practical use is made of the capacities belonging to the transmitting and receiving sides along with their supply mains for the amplifying arrangement. These comparatively big capacities—they are diagrammatically indicated by the condensers C—are interpolated into the system by means of the connections $k^1$ and $k^2$ (Fig. 4).

Fig. 5 discloses the protective connections which may be made use of in accordance with the foregoing explanations in the case of two cathode tubes connected in series.

The negative poles of the 6-volt and 110-volt batteries are grounded, as diagrammatically shown in Fig. 3. The end of the secondary coil S of the translator $v$ is connected to the earth across the 6-volt battery, while the end of the primary winding P of the translator $n$ is grounded across the 110-volt battery. As the resistance offered by the batteries is but very small, the difference of alternating current voltage in the case of both winding ends may be looked upon as being equal to zero. The ends of the primary winding of $v$ and of the secondary winding of $n$ are, in accordance with the diagram disclosed by Fig. 4, likewise grounded, so that also in this case no difference of alternating current voltage will exist.

However, in cases where the degree of amplification effected is very high, the auxiliary connections hereinbefore explained with reference to Figs. 1 to 5 will prove inadequate. The fact is that, as experience has shown, the reciprocal electrostatical action prevailing between certain elements of a connection comprising amplifying devices may be the cause of a self-excitation of the connection. Now with the view to obviating this self-excitation as far as it is attributable to this cause, all those elements of the connection, through the mutual capacities of which portions of the amplified current might be liable to return to the receiver end of the same tube or of an immediately preceding tube, are surrounded with metallic coverings of any suitable kind, which are electrically connected to the negative pole of each individual or of a common local battery. In order to obtain the effect desired it may, under certain conditions, already suffice to merely enclose the translators in the manner indicated. Where the degree of amplification is very high, however, it will be necessary to likewise protect all those conductors which evince any differences of alternating current potential relatively to each other. Conductors of this description, for example, in case vacuum tubes are used as amplifiers, will be primarily the supply mains for the auxiliary electrodes of the tubes, as also the supply mains for their anodes. In certain cases it may even prove expedient to extend these improved means of protection to the amplifying tubes themselves.

For the purpose of saving coverings, those of the conductors appertaining to the amplifier tube connections which embody no, or but insignificant differences of potential, are connected unipolarly with the local battery, respectively, with the system of protective coverings and by these means are turned into conductors requiring no such protection, so that the conductors remaining unprotected will be productive of no objectionable potentials. The coverings not only serve to protect the individual elements of the system of connection relatively to each other, but they also serve to keep out any electrical disturbances coming from without. Figs. 6 and 7 disclose, by way of example, a sound amplifying arrangement in accordance with this invention comprising two cathode ray tubes $V^1$, $V^2$ in cascade connection.

In this arrangement the incoming alternating current flows across a pre-translator $P^1$, $S^1$ into the first tube $V^1$, the amplified current of which is conducted across an additional translator $P^2$, $S^2$ to the second tube $V^2$. A sub-translator $P^3$, $S^3$ finally connects the transmitter side of the tube $V^2$ with the point of consumption, say a telephone $t$. A heating battery $B^1$ is connected across series resistances $w^1$ and $w^2$, respectively, to the glow cathode of the tubes $V^1$ and $V^2$, while a battery $B^2$ supplies the anode current for the transmitter sides of the tubes.

The translator coils $S^1$, $P^2$, $S^2$, $P^3$ are intercoupled at one of their winding ends by means of short circuit connections, while the other ends of their windings and the mains $l^1$, $l^2$, $l^3$, $l^4$ intermediate the respective translator coils and the auxiliary electrodes, respectively, anodes of the tubes $V^1$, $V^2$, are reciprocally connected by mutual capacities, of which the most objectionable are represented in dotted lines in Fig. 6 by the condensers $C^1$, $C^2$, $C^3$ and $C^4$. Now these capacities may of course also be composed of partial capacities of the individual elements relatively to the earth, respectively, the casing. In this way there is created a coupling between the individual translator windings $S^1$, $P^2$, $S^2$, $P^3$, in consequence of which the amplified current is enabled to return to the receiver sides of the amplifying tubes.

The diagram in Fig. 7 is intended to show how this objectionable condition may be removed in accordance with this invention. The enclosed portions of the drawing shown in heavy lines represent the metallic covers in which the translators $P^1$, $S^1$, $P^2$, $S^2$, $P^3$, $S^3$ and the mains $l^1$, $l^2$, $l^3$, $l^4$ are enclosed. These covers are electrically interconnected by means of mains $s^1$ to $s^6$, being in addition connected by a common main $s^7$ across the point R to the negative pole of the heating battery $B^1$. Besides this, though this is a feature unessential for the present invention, points $O^1$ and $O^2$ of the translator coils $P^1$ and $S^3$ are connected by the mains $a^1$, $a^2$ likewise across the point R, to the battery $B^1$ point R being moreover grounded by means of the main $a^3$.

I claim:

1. An amplifying system comprising amplifying tubes, transformers for connecting said tubes in cascade, two batteries, one battery feeding the heating circuit and the other feeding the anode circuit, and having a common pole, which is grounded, both batteries being suitably associated with said tubes, in combination with connections inserted between the primary windings of said transformers and the non-grounded pole of the said second named battery and other connections between the secondary windings of said transformers and said common grounded poles of the batteries of the system, the input and output transformers connected to the system, the primary and secondary windings of said input and the output transformers being connected to the grounded common poles of said batteries.

2. An amplifying system comprising amplifying tubes, transformers for connecting said tubes in cascade, two batteries, one battery feeding the heating circuit and the other feeding the anode circuit, both batteries having a common pole which is grounded, and both being suitably associated with said tubes, in combination with metallic coverings surrounding the circuit connections, the transformers and the elements through the mutual capacities of which portions of the amplified currents might be apt to return to the input side of one of the amplifying tubes, said coverings being connected to each other and to the common grounded poles of the batteries of the system.

3. An amplifying system comprising amplifying tubes, transformers for connecting said tubes in cascade, two batteries, one battery feeding the heating circuit and the other feeding the anode circuit, both batteries having a common pole, which is grounded, and both being suitably associated with said tubes, in combination with connections inserted between the primary windings of said transformers and the non-grounded pole of the said second named battery and other connections between the secondary windings of said transformers and said common grounded poles of the batteries of the system, the input and output transformers connected to the system, the primary and secondary windings of said input and output transformers being connected to the common grounded poles of said batteries, metallic coverings surrounding the circuit connections, transformers and elements through the mutual capacities of which portions of the amplified current might be apt to return to the input side of one of said amplifying tubes, said coverings being connected to each other and to said common grounded poles of said batteries.

In testimony whereof I affix my signature.

BRUNO GERHARD POHLMANN.